United States Patent Office 3,360,563
Patented Dec. 26, 1967

3,360,563
MYRISTYL DIMETHYL BENZYLAMMONIUM
CHLORIDE DIHYDRATE
Simon Bonta, Cincinnati, Ohio, assignor to Sterling Drug
Inc., New York, N.Y., a corporation of Delaware
No Drawing. Filed Aug. 1, 1966, Ser. No. 569,019
1 Claim. (Cl. 260—567.6)

This invention relates to an improvement in quaternary ammonium germicides. In particular, it concerns a novel crystalline quaternary ammonium germicide having unique properties which make it suitable for commercial use in free-flowing granular or powder form.

The need for a crystalline germicide possessing high bactericidal and algicidal activity has long been recognized. However, heretofore, the preferred quaternary ammonium germicide, myristyl dimethyl benzylammonium chloride, has not been available in unadulterated crystalline form suitable for commercial purposes because of its low melting point and its tendency to absorb moisture from the air, with resulting caking or formation of lumps.

In accordance with the present invention, I have discovered that the novel product myristyl dimethyl benzylammonium chloride in the form of its substantially pure crystalline dihydrate is free from the above-mentioned defects, and is well suited for commercial use in free-flowing granular or powder form. Myristyl dimethyl benzylammonium chloride dihydrate is stable to the absorption of water from moist air and it melts at 60–61° C., at least ten degrees higher than either anhydrous myristyl dimethyl benzylammonium chloride or its monohydrate.

Myristyl dimethyl benzylammonium chloride dihydrate is conveniently prepared by crystallizing myristyl dimethyl benzylammonium chloride from a suitable organic solvent containing at least two moles of water per mole of quaternary ammonium salt. A suitable organic solvent is any organic solvent in which the product is soluble while the solvent is hot and slightly soluble when cold and with which water is sufficiently miscible to enable at least two moles of water for each mole of quaternary ammonium salt to be dissolved. The solvent may be a single organic material, or it may be a mixture of two or more solvents. Suitable solvents for the purpose of my invention include for example acetone, acetone-hexane, isopropyl acetate, and acetone-isopropyl acetate.

EXAMPLE

To a glass-lined Pfaudler reactor was added 605 pounds of myristyldimethylamine and 113 pounds of water. The charge was heated to 80° C., and 148 pounds of benzyl chloride was added over a period of one hour while maintaining the temperature at 80–85° C. The mixture was allowed to cool to 70–75° C., and 42 pounds of acetone was added carefully. The solution was then reheated to 80–85° C., and the temperature was maintained while 155 pounds of benzyl chloride was added over a period of one hour, and the mixture was stirred for two hours. The solution was cooled to 60° C. and 1973 pounds of isopropyl acetate was added. After the solution was cooled to 14° C., the product which crystallized was collected on a filter and was washed with 634 pounds of cold, dry isopropyl acetate. The product, myristyl dimethyl benzylammonium chloride dihydrate, was dried in a Conaform (continually-rotating, vacuum-type) drier at room temperature and under a vacuum of about 21 inches of mercury with a slight air bleed. Myristyl dimethyl benzylammonium chloride dihydrate prepared as described above was analyzed for water content by the Karl Fischer method and found to contain substantially two moles of water for each mole of quaternary ammonium salt. The product was a white crystalline solid which was stable in air without loss or gain of water, and it melted at 60–61° C. The crystals were easily ground to give a free-flowing, stable white powder form of myristyl dimethyl benzylammonium chloride dihydrate which was adaptable for commercial use without melting or caking.

The stability of myristyl dimethyl benzylammonium chloride dihydrate toward loss of its water of crystallization is demonstrated by the data in the following table which were obtained by the method of Carpenter and Jette, J. Am. Chem. Soc., 45, 578 (1923). In the table, the vapor pressure of water at each of the indicated temperatures was taken from the published literature. The term "Dihydrate" refers to myristyl dimethyl benzylammonium chloride dihydrate prepared as described above. The minimum relative humidity at which the dihydrate is stable toward loss of water of crystallization at each indicated temperature is given in the column labelled "Relative Humidity Percent."

| Temperature, °C. | Vapor Pressure, mm. Hg | | Relative Humidity, Percent |
|---|---|---|---|
| | Water | Dihydrate | |
| 25 | 23.8 | 7.2 | 30.1 |
| 30 | 31.8 | 8.8 | 27.7 |
| 35 | 42.2 | 10.9 | 26.1 |
| 40 | 55.3 | 13.7 | 24.8 |
| 45 | 71.9 | 18.3 | 25.4 |
| 50 | 92.5 | 25.7 | 27.7 |
| 55 | 118.0 | 35.5 | 30.2 |

I claim:
Myristyl dimethyl benzylammonium chloride as the substantially pure crystalline dihydrate.

References Cited

UNITED STATES PATENTS 2,951,787   9/1960   Cicero et al. _____ 167—30

NICHOLAS S. RIZZO, Primary Examiner.
F. A. MIKA, Assistant Examiner.